(12) United States Patent
Wang

(10) Patent No.: US 11,122,335 B2
(45) Date of Patent: Sep. 14, 2021

(54) WISHING TELEVISION

(71) Applicant: TCL RESEARCH AMERICA INC., San Jose, CA (US)

(72) Inventor: Haohong Wang, San Jose, CA (US)

(73) Assignee: TCL RESEARCH AMERICA INC., San Jose, CA (US)

( * ) Notice: Subject to any disclaimer, the term of this patent is extended or adjusted under 35 U.S.C. 154(b) by 56 days.

(21) Appl. No.: 16/693,204

(22) Filed: Nov. 22, 2019

(65) Prior Publication Data

US 2021/0160578 A1 May 27, 2021

(51) Int. Cl.
H04N 21/472 (2011.01)
G10L 15/20 (2006.01)
H04N 21/422 (2011.01)
G06F 16/40 (2019.01)
G10L 15/22 (2006.01)

(52) U.S. Cl.
CPC ....... H04N 21/47205 (2013.01); G06F 16/40 (2019.01); G10L 15/20 (2013.01); H04N 21/42203 (2013.01); G10L 2015/223 (2013.01)

(58) Field of Classification Search
CPC ........ H04N 21/47205; H04N 21/42203; G06F 16/40; G10L 15/20; G10L 2015/223
See application file for complete search history.

(56) References Cited

U.S. PATENT DOCUMENTS

| 8,595,773 | B1 | 11/2013 | Wang et al. |
| 8,831,902 | B2 | 9/2014 | Wang |
| 8,856,845 | B2 | 10/2014 | Wang |
| 8,869,211 | B2 | 10/2014 | Wang |
| 8,964,127 | B2 | 2/2015 | Wang |
| 9,100,701 | B2 | 8/2015 | Wang |
| 9,866,913 | B1 | 1/2018 | Wang |
| 2010/0205628 | A1* | 8/2010 | Davis ............... H04N 21/41265 725/25 |
| 2019/0098371 | A1* | 3/2019 | Keesan ............ H04N 21/25883 |

OTHER PUBLICATIONS

Haohong Wang, etc., (Apr. 2018). "A New TV World for Kids—When ZUI Meets Deep Learning". In 2018 IEEE conference on Multimedia Information Processing and Retrieval (MIPR) (pp. 124-129). IEEE.
What's on Netflix. (2019). List of Interactive Titles on Netflix. [Online]. Available from: https://www.whats-on-netflix.com/library/interactive-titles-on-netflix/ [Accessed: Oct. 25, 2019].
Wikipedia. (2019). Interactive film. [Online]. Available from: https://en.wikipedia.org/wiki/Interactive_film [Accessed: Oct. 10, 2019].

(Continued)

*Primary Examiner* — Nathan J Flynn
*Assistant Examiner* — Christine A Kurien
(74) *Attorney, Agent, or Firm* — Anova Law Group, PLLC

(57) ABSTRACT

An interaction method includes receiving an interaction indicating a user's wish, interpreting the interaction to obtain an interpreted wish, identifying a realization story in a hyperstory according to the interpreted wish, sending a feedback message indicating a time the user's wish will be realized and a response-to-wish confidence level, generating a realization video according to the realization story, and outputting the realization video.

29 Claims, 7 Drawing Sheets

(56) References Cited

OTHER PUBLICATIONS

Antonia Hitchens. (2019). Netflix's Carla Engelbrecht Chooses Her Own Adventures. [Online]. Available from: https://www.wired.com/story/culture-fan-tastic-planet-netflix-carla-engelbrecht/ [Accessed: Oct. 25, 2019].

Quentin Galvane, "Automatic Cinematography and Editing in Virtual Environment", Graphics [cs.GR], Grenoble 1 UJF, University of Joseph Fourier, 2015, Part 1.

Quentin Galvane, "Automatic Cinematography and Editing in Virtual Environment", Graphics [cs.GR], Grenoble 1 UJF, University of Joseph Fourier, 2015, Part 2.

Quentin Galvane, "Automatic Cinematography and Editing in Virtual Environment", Graphics [cs.GR], Grenoble 1 UJF, University of Joseph Fourier, 2015, Part 3.

V. Propp, "Morphology of the Folktale", American Folklore Society Bibliographical and Special Series, vol. 9, 1968, the American Folklore Society and Indiana University.

McKee, Robert, "Story Substance, Structure, Style, and the Principles of Screenwriting", ReganBooks, 1997, An Imprint of Harper Collins Publishers, New York.

Craig Caldwell, "Story Structure and Development: A Guide for Animators, VFX Artists, Game Designers, and Virtual Reality", CRC Press, 2017, Taylor & Francis Group, LLC, Florida.

Vogler, Christopher. The Writer's Journey. Studio City, CA: Michael Wiese Productions, 2007.

* cited by examiner

| Step: Scar sets a trap for his brother and nephew by luring Simba into a gorge | | | | | |
|---|---|---|---|---|---|
| Kingship of Mufasa | Live of Mufasa | Kingship of Scar | Live of Scar | Kingship of Simba | Live of Simba |
| Status: 2 | 2 | 1 | 2 | 0 | 2 |

WISHING TELEVISION

TECHNICAL FIELD

The present disclosure relates to video entertainment technology and, more particularly, to a video entertainment system, a television (TV), a computer readable medium, and an interaction method thereof.

BACKGROUND

Television (TV) is likely the most common and influential entertainment device for human beings. Conventional televisions (TVs) are designed based on an assumption that watching TV is a relaxing experience that needs as little user interaction as possible. Therefore, many technologies and innovations have been deployed to save a user from interactions.

For example, the frequency of user interaction and/or clicks on keys of a remote control was considered as a basic metric to evaluate the performance of a TV. Sensing-based automatic user identification learning approaches were studied and personalized, and recommendations were proposed to speed up a user interaction process in front of a TV. Content layout structure and organization of the TV were explored, and a Zoom-able user interaction mechanism that enables a much quicker content search and selection process was proposed. Object-level access and interaction tasks during TV watching were investigated, such that the user handles watching experiences like TV shopping and information retrieval in a close to real-time manner. Among other examples, a simple experience called Binary TV was proposed that completely saves the user from interacting with complex remote controls, in which the user only need to make immediate binary (yes or no) decision when a query comes from TV.

In some designs, interactive film acts similarly as "Choose Your Own Adventure" books, where the stories are formatted so that periodically a protagonist faces two or three options, each of which leads to more options, and then to one of many endings. However, a frequent interaction requirement to users in front of TV makes it not favorable for users.

Thus, a desirable feature is to keep the unpredictability of storytelling but not interrupt the users unless they intend to pause. One solution may be to let the user become a trigger of interactions (instead of letting TV provide options periodically), which imposes huge challenges on TV for at least two reasons: (1) The users may trigger interaction at any time, which could generate thousands of interaction points, which is too much in comparison to the current 10 to 50 interaction points in the current iteration film; (2) The large volume of users may generate millions of different requests, which is a different magnitude of options comparing to the options in the current interactive film. The disclosed devices are directed to solve one or more problems set forth above and other problems.

SUMMARY

In accordance with the disclosure, there is provided an interaction method including receiving an interaction indicating a user's wish, interpreting the interaction to obtain an interpreted wish, identifying a realization story in a hyperstory according to the interpreted wish, sending a feedback message indicating a time the user's wish will be realized and a response-to-wish confidence level, generating a realization video according to the realization story, and outputting the realization video.

Also in accordance with the disclosure, there is provided a television (TV) including a processor, a memory coupled to the processor, and a screen coupled to the memory. The memory stores instructions that, when executed by the processor, cause the processor to receive an interaction indicating a user's wish, interpret the interaction to obtain an interpreted wish, identify a realization story in a hyperstory according to the interpreted wish, send a feedback message indicating a time the user's wish will be realized and a response-to-wish confidence level, generate a realization video according to the realization story, and output the realization video. The screen is configured to display the realization video.

Also in accordance with the disclosure, there is provided a computer readable medium storing instructions that, when executed by a computer, cause the computer to receive an interaction indicating a user's wish, interpret the interaction to obtain an interpreted wish, identify a realization story in a hyperstory according to the interpreted wish, send a feedback message indicating a time the user's wish will be realized and a response-to-wish confidence level, generate a realization video according to the realization story, and output the realization video.

Table 1 shows story segments and associated statuses consistent with embodiments of the disclosure.

DETAILED DESCRIPTION OF THE EMBODIMENTS

Hereinafter, embodiments consistent with the disclosure will be described with reference to the drawings, which are merely examples for illustrative purposes and are not intended to limit the scope of the disclosure. Wherever possible, the same reference numbers will be used throughout the drawings to refer to the same or like parts.

The present disclosure provides a video entertainment system allowing any user to interact with the system at any time. The video entertainment system can interpret a user's interaction indicating his/her immediate wish, and then dynamically generate a realization story satisfying his/her wish in a near future (if the wish has a short-term impact) or in a later time (if the wish has a long-term impact). A user's wish may be any desired operation, such as changing a character's arc, making a choice for a character, adding a new event, or the like.

Figure 1:
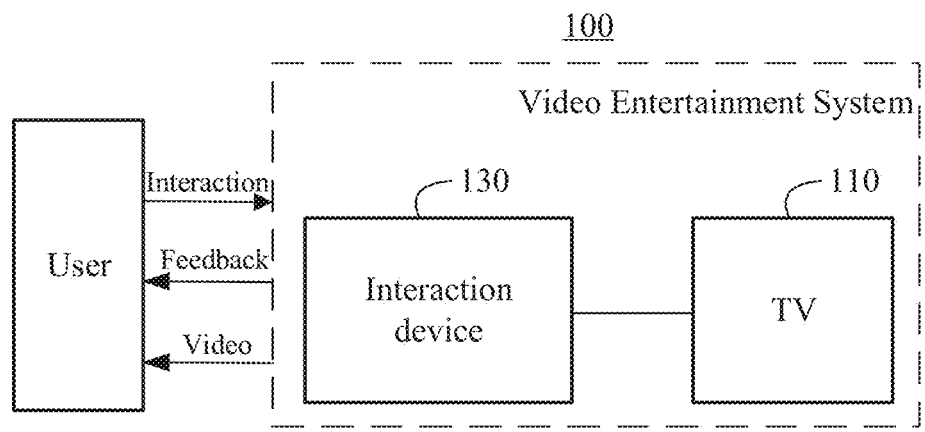
FIG. 1 is a schematic diagram of a video entertainment system consistent with embodiments of the disclosure.

FIG. 1 is a schematic diagram of an example video entertainment system 100 consistent with the disclosure. As shown in FIG. 1, the video entertainment system 100 includes a television (TV) 110 and an interaction device 130 communicatively coupled to the TV 110. The interaction device 130 and the TV 110 can communicate with each other through a wired or wireless connection. The wireless connection can include WiFi, Bluetooth, Zigbee, LTE, or the like.

The interaction device 130 can be configured to receive an interaction from a user and send the interaction to the TV 110. The interaction can indicate a user's wish. The user's wish may be any desired operation, for example, changing a character's arc (e.g., a journey of the character over a course of a story), making a choice for the character, adding a new event, or the like. The interaction can be inputted by the user at any time. In some embodiments, the interaction can include a voice command, for example, "I hope Susie will survive." The interaction device 130 can be a device having a microphone, for example, a mobile phone, a mobile device having a built-in microphone, an internet of things (IoT) having a microphone (e.g., an IoT toy), or the like. The microphone of the interaction device 130 can receive the voice command from the user.

In some embodiments, the interaction device 130 can be a device having a touch screen, for example, a mobile phone, a tablet, or the like. The touch screen can include a touch panel for receiving the interaction from the user. The user can input the interaction by touching the touch screen with an external object, such as a finger of the user or a stylus. For example, the interaction can include a text command, and the user can express his/her wish by inputting the text command, for example, "I hope Sam will win," via the touch screen. As another example, the interaction can include menu selections. For example, the user can scroll vertically or horizontally on the touch screen to select a character (e.g., John), and then select a future status (e.g., "Go to Jail") for the character in a pop-up menu on the touch screen to express the wish of "Put John in Jail." In some embodiments, the interaction device 130 can be a remote controller or a mouse. The user can input the text command or select options in the menu selections by clicking keys of the remote controller or using the mouse.

In some embodiments, the interaction can include a hand gesture. The interaction device 130 can be a device having a camera, such as a mobile phone, a tablet, or the like. The camera can capture the hand gesture of the user. For example, the user can express his/her wish by using the hand gesture in combination with the menu selections. That is, the user can use the hand gesture to select the options in the menu selections to express his/her wish.

In some embodiments, the interaction can include a head movement or an eye movement. The interaction device 130 can be a head-mount device, such as, a virtual reality (VR) headset, an augmented reality (AR) headset, smart glasses, or the like. In some embodiments, the head-mount device may include an inertial measurement unit (IMU). The IMU can include at least one inertial sensor, such as, an accelerometer, a gyroscope, a magnetometer, or the like. Thus, the head-mount device can track the head movement in Three Degrees of Freedom (3DoF), for example, three rotational movements (i.e., rolling, pitching, and yawing). In some other embodiments, the head-mount device may include a camera. Thus, the head-mount device can track the eye movement. For example, the user can express his/her wish by using the head movement or the eye movement in combination with the menu selections. That is, the user can use the head movement or the eye movement to select the options in the menu selections to express his/her wish.

In some embodiments, functions of the interaction device 130 can be integrated into the TV 110, and thus the interaction device 130 can be bypassed or omitted. For example, the TV 110 can have a build-in microphone, such that the TV 110 can directly receive the voice command from the user. As another example, the TV 110 can have a build-in camera, such that the TV 110 can directly receive the hand gesture, the head movement, or the eye movement of the user.

In some embodiments, the TV 110 can be configured to receive the interaction from the interaction device 130 via the wired or wireless connection. In some other embodiments, the TV 110 can be configured to directly receive the interaction from the user without passing the interaction device 130. After receiving the interaction of the user, the TV 110 can be further configured to interpret the user's interaction and generate a realization video satisfying the user's wish.

In some embodiments, the TV 110 can be further configured to send a feedback message to notify the user about, for example, a realization latency, a response-to-wish confidence level, and/or the like. The realization latency can indicate when the user's wish will be realized, and the response-to-wish confidence level can reflect how well the realization video can satisfy the user's wish. In some embodiments, the TV 110 can send the feedback message to the interaction device 130, and the interaction device 130 can output the feedback message to the user. The feedback message can be outputted in any suitable format, for example, a voice feedback message, a text feedback message, or the like. In some other embodiments, the TV 110 can send the feedback message directly to the user via, for example, a screen of the TV 110.

In some embodiments, the TV 110 can be configured to perform an interaction method consistent with the disclosure, such as, one of the examples interaction methods described below. The TV 110 can include a smart TV, a mobile-based TV, a PC-based TV, a projection-based TV, a set-top-box/stick based TV, or the like.

Consistent with the disclosure, the video entertainment system 100 can allow the user to make wishes (either explicitly or implicitly) during a TV watching process and then generate the realization story following his/her wishes accordingly. As such, the video entertainment system can combine a relaxing nature of TV experience and the human being's nature of curiosity and tendency of involvement.

Figure 2:
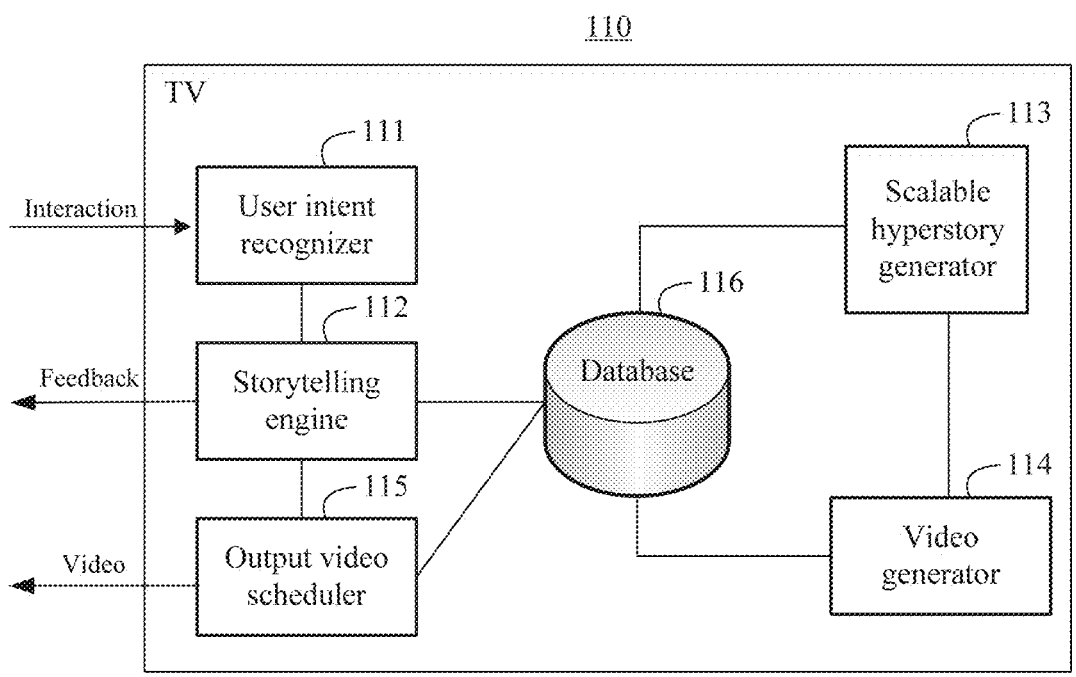
FIG. 2 is a schematic diagram of a television (TV) consistent with embodiments of the disclosure.

FIG. 2 is a schematic diagram of a TV 110 consistent with the disclosure. As shown in FIG. 2, the TV 110 includes a user intent recognizer 111, a storytelling engine 112 coupled to the user intent recognizer 111, a scalable hyperstory generator 113, a video generator 114 coupled to the scalable hyperstory generator 113, an output video scheduler 114 coupled to the storytelling engine 112, and a database 116 coupled to the storytelling engine 112, the scalable hyperstory generator 113, the video generator 114, and the output video scheduler 115. A hyperstory in the present disclosure refers to a network of narratives with a branching structure in which a user can make choices among plot changes at various points of the narratives.

In some embodiments, the user intent recognizer 111 can be electrically coupled to the interaction device 130 and configured to receive the interaction of the user from the interaction device 130. In some other embodiments, the user intent recognizer 111 can be configured to directly receive the interaction from the user without passing the interaction device 130. After receiving the interaction of the user, the user intent recognizer 111 can be further configured to interpret the user's interaction to obtain an interpreted wish and send the interpreted wish to the storytelling engine 112. In some embodiments, the interpreted wish can include a template of wish command, for example, "who (i.e., which character)+what (i.e., future status)+when (i.e., happening time)+where (happening place)", and/or the like.

In some embodiments, when the interaction includes a voice command, the user intent recognizer 111 can interpret the voice command by performing a natural language processing (NLP) to derive wish information, for example, who, when, what (character status), or the like, from the voice command and convert the wish information to the template of wish command. For example, if the user inputs a voice command "I hope Susie will survive," the user intent recognizer 111 can perform the NLP to derive the wish information from the voice command and covert the wish information to the template of wish command "Susie (who)+ Survive (what/future character status)."

In some embodiments, when the interaction includes a hand gesture, the user intent recognizer 111 can recognize the hand gesture by performing a hand gesture recognition algorithm, for example, a 3D model-based algorithm, a skeletal-based algorithm, or the like. In some embodiments, when the interaction includes the head movement or the eye movement, the user intent recognizer 111 can track the head movement or eye movement by performing a motion tracking algorithm, for example, a motion tracking algorithm based on deep learning, or the like.

In some embodiments, when the interaction includes a text command, the text command can be directly converted to the template of wish command. For example, if the user inputs a text "I hope David can win," and the user intent recognizer 111 can convert the text to the template of wish command "David (who)+Win (what/future character status)."

The scalable hyperstory generator 113 can be configured to generate a hyperstory or obtain a hyperstory from database 116. The hyperstory refers to a network of story plots or a story graph including various branches. Each branch can correspond to an option the scalable hyperstory generator 113 creates or a choice the characters or a user may choose. Therefore, each sequential story has a unique path in the story graph with a network of story plots (character choices/ status). The path can consist of a sequence of branches depending on options the scalable hyperstory generator 113 creates and/or choices the characters choose. The hyperstory can be generated manually or can be automatically generated by a computer. The hyperstory can be stored in database 116. The scalable hyperstory generator 113 can generate new stories in various branches with various quality level, and the quality level can be defined in a scalable manner from time to time. A scalability reflects a nature of a story lifecycle from an idea to a more matured version, and then finally may become a masterpiece. Therefore, a story at different quality levels may be obtained at difference stages of the story to fit for different group or number of audiences.

Figures 3, 4:
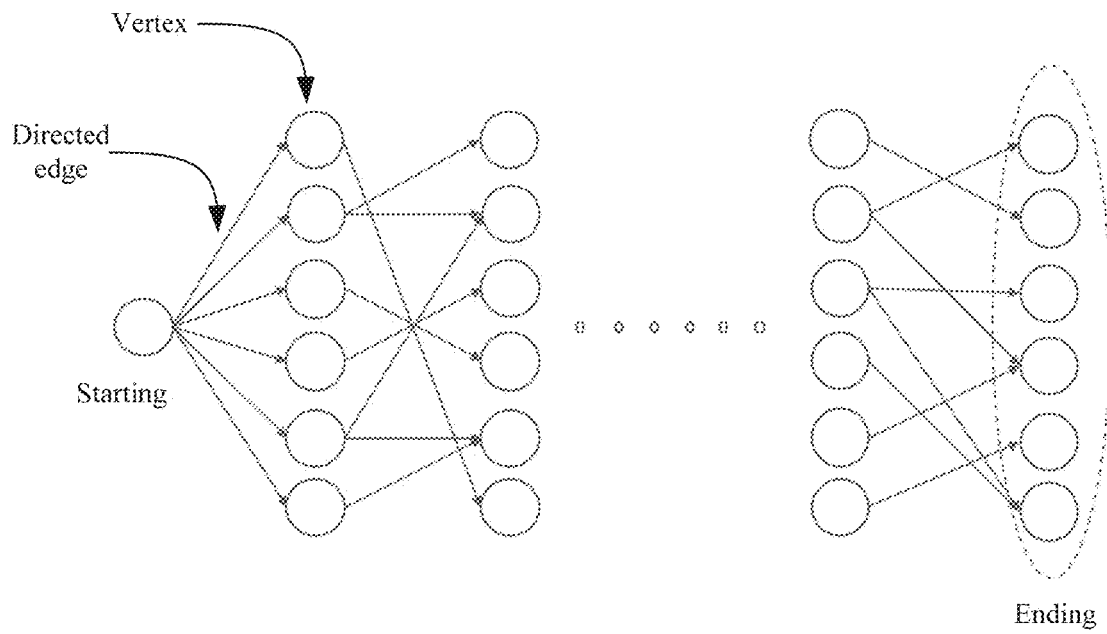
FIG. 3 schematically shows a representation of a hyperstory consistent with embodiments of the disclosure.
FIG. 4 schematically shows an associated status for a story segment in Table 1 consistent with embodiments of the disclosure.

FIG. 3 schematically shows a representation of the hyperstory consistent with the disclosure. As shown in FIG. 3, the hyperstory is represented using a directed acyclic graph (DAG). Each vertex in the DAG represents a status of one of main characters, and a directed edge from one vertex to another refers to an event that causes a status change of the corresponding character. As shown in FIG. 3, the DAG has a single starting vertex, because a setting of all stories contained in the hyperstory are the same at the beginning, but the DAG has more than one end vertices due to the fact that many endings for various stories can be generated during a story creation process. Any one of the paths from starting vertex to the end vertices could be a possible story as long as the basic criteria of a good story can be satisfied. The edges from one vertex to multiple vertices can be considered as multiple branches of the story graph.

Take a well-known movie/story, Lion King as an example, to demonstrate a DAG structure in FIG. 2. In the Lion King story, there are 3 main characters, namely Mufasa, Scar and Simba. The story touches heavily on 2 layers of the Maslow's hierarchy of needs theory, i.e., Kingship and Live/Death. If we define Kingship=0 means not thinking of kingship, 1 means eager to get kingship, and 2 means securing kingship; define Live=0 means dead, 1 means in danger, and 2 means live without immediate danger, such that the status of all 3 characters can be represented by a 6-tuple consists of Kingship and Live value of all 3 characters Mufasa, Scar and Simba.

Table 1 shows example story segments and associated statuses consistent with the disclosure. As shown in Table 1, a portion of the story with 7 segments (or steps) are demonstrated, where the associated statuses are marked as well.

TABLE 1

Story segments and associated statuses

| No | Segment/Step | Status |
|---|---|---|
| 1 | Scar sets a trap for his brother and nephew by luring Simba into a gorge | 221202 |
| 2 | Simba is trampled by a large herd of wildebeest driven by the hyenas | 221201 |
| 3 | Mufasa is informed by Scar of Simba's peril, and saves Simba | 221202 |
| 4 | Mufasa ends up hanging perilously from the gorge's edge | 211202 |
| 5 | Scar sends Mufasa falling to his death | 001202 |
| 6 | Scar convinces Simba that the tragedy was Simba's own fault, and orders hyenas to kill the cub | 001201 |
| 7 | Scar steps forward as the new king | 002201 |

Each associated status is represented by the 6-tuple in an order of Kingship of Mufasa, Live of Mufasa, Kingship of Scar, Live of Scar, Kingship of Simba, and Live of Simba. FIG. 4 schematically shows the associated status for the story segment 1 in Table 1 consistent with the disclosure. Take the story segment 1 as an example, Mufasa is still the King and alive in segment 1, so Kingship of Mufasa equals to 2 and Live of Mufasa equals to 2. Scar is not the King but eager to get the kingship and he is alive in segment 1, so Kingship of Scar equals to 1 and Live of Mufasa equals to 2. Simba is not thinking of the kingship and he is alive in segment 1, so Kingship of Simba equals to 0 and Live of Simba equals to 2. As such, the associated status for the story segment 1 is 221202.

Figure 5:
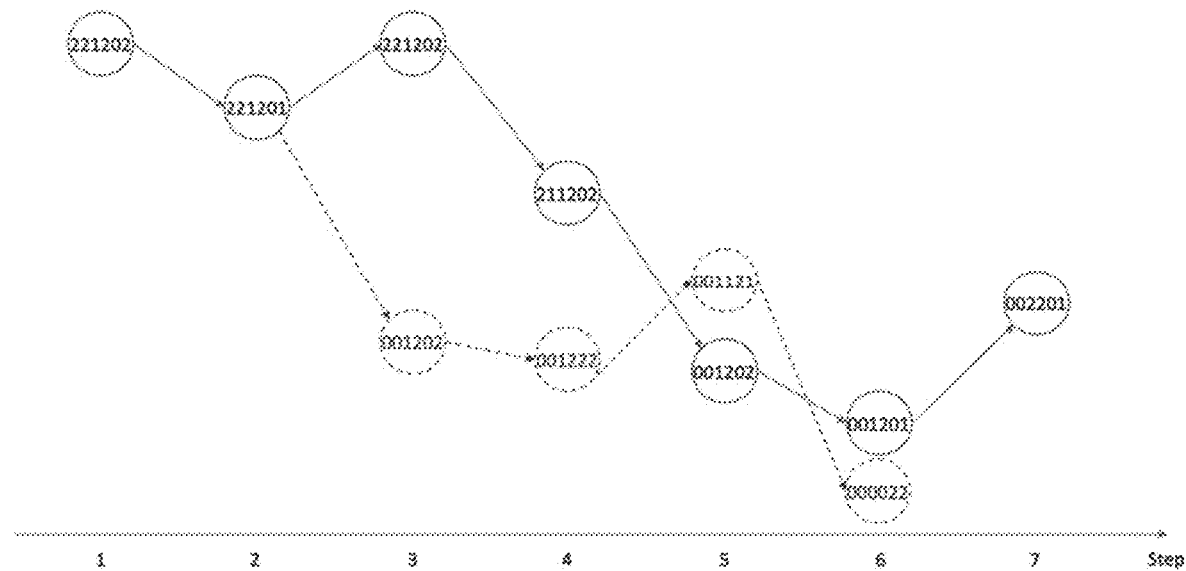
FIG. 5 schematically shows a directed acyclic graph (DAG) representation of a story in Table 1 consistent with embodiments of the disclosure.

FIG. 5 schematically shows an example DAG representation of the story in Table 1 consistent with the disclosure. As shown in FIG. 5, the DAG representation of the story is demonstrated with a path in solid lines. Each vertex represents the associate status in each step and each edge represents a transaction from one status to another.

As shown in FIG. 5, by adding the vertices and edges in dashed lines, a new story can be generated as an example. From the status transaction, a story line between two adjacent steps can be completed. For example, from (221201) to (001202) it may refer that Mustafa saved Simba but lost his own life. As another example, from (001202) to (001222) it may refer that Simba steps forward as the new King. It can be appreciated that a space of the new story generation is huge in the DAG structure, which is relevant to the number of the steps of the hyperstory. In addition, durations of different stories in the hyperstory may vary even the number of steps of the stories is fixed, which is highly relevant to an actual performance time according to these steps and an edit and cut process in the video postprocessing stage. New story path can be added into the hyperstory in a scalable manner either by manually story creation or by automation.

In some embodiments, the scalable hyperstory generator 113 can be also configured to send the hyperstory to the database 116 and the database 116 can be configured to store the hyperstory, such that other components of the TV 110, such as the storytelling engine 112, the video generator 114, or the like, can retrieve the hyperstory from the database 116.

The storytelling engine 112 can be configured to receive the interpreted wish from the user intent recognizer 111 and identify the realization story from an existing availability of the story branches in the hyperstory generated by the scalable hyperstory generator 113.

In some embodiments, the realization story can be found by determining a realization vertex in the hyperstory to meet the user's wish as well as a realization path from a wishing point vertex to the realization vertex based on a plurality of factors. For example, the realization latency (i.e. a duration between the interaction of the user is received and the realization video is outputted), the quality level of the realization video, the response-to-wish confidence level, and/or the like. The wishing point vertex refers to a vertex close to a point when the interaction of the user is received. The realization vertex can be a best realization vertex among all possible realization vertices in the hyperstory. The realization path can be a best realization path among all possible realization paths in the hyperstory.

In some embodiments, a user's wish may be interpreted and multiple realization vertices may be determined based on the interpreted wish. That is, the user may determine what happens at multiple points of the story. For example, the multiple realization vertices satisfying the interpreted wish can be obtained in the hyperstory. The multiple realization vertices can be sent to the user and the user can choose the realization vertex from the multiple realization vertices and determine the realization path from the wishing point vertex to the realization vertex.

Figure 6:
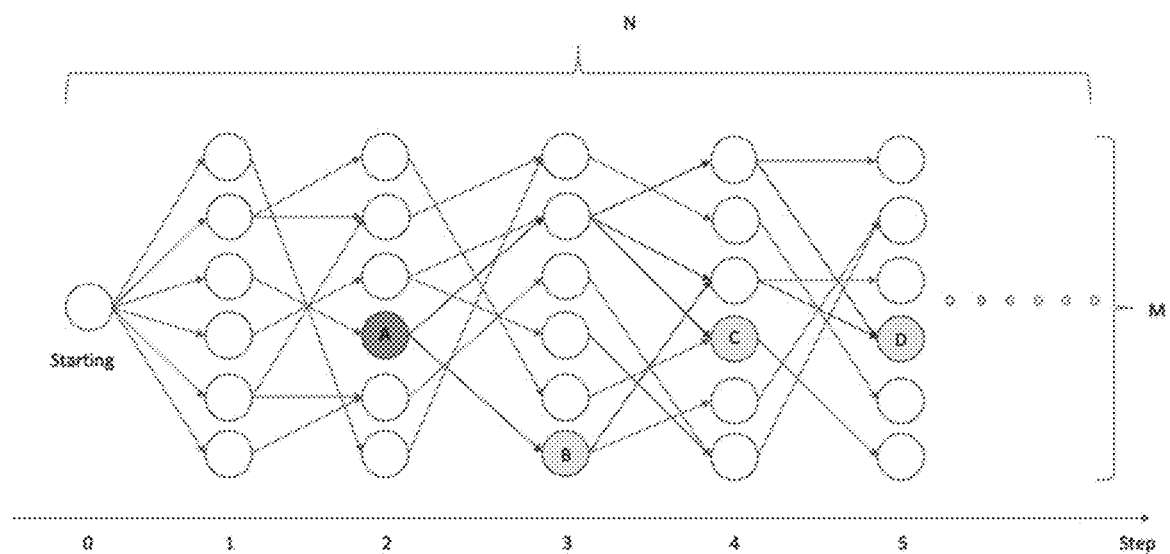
FIG. 6 schematically shows an example of identifying a realization story from an existing availability of branches in a hyperstory consistent with the disclosure.

FIG. 6 schematically shows an example of identifying the realization story from the existing availability of the branches in the hyperstory consistent with the disclosure. For example, as shown in FIG. 6, a point A is the wishing point vertex, and vertices B, C, and D are possible realization vertices, and the possible realization paths from A to B, A to C, and A to D are marked in bold lines. The possible realization vertices B, C, and D and the possible realization paths can be determined according to the interpreted wish. Referring again to Table 1, for example, if the interpreted wish is "Scar (who)+New King (what/future character status)," the possible realization vertices B, C, and D may be the vertices having status "22." The symbol "*" represents that it can be any value. As such, any path from A to B, A to C, and A to D can be determined as the possible realization path.

The storytelling engine 112 can be configured to identify the realization story by determining a point from B, C, and D and only one path from A to this point based on the realization latency, the quality level of the realization video, the response-to-wish confidence level, and/or the like. In some embodiments, the storytelling engine 112 can be configured to perform a wish-realization-distance (WRD) method consistent with the disclosure, such as, one of the examples WRD methods described below. The WRD method can use a WRD function to dynamically measure a plurality of distances between the wishing point vertex and the possible realization vertices. With the WRD function, identifying the realization story can be converted to identify a minimum value for the plurality of distances (e.g., AB, AC, and AD).

After identifying the realization story, the storytelling engine 112 can be further configured to notify the user in, for example, when his/her wish will be realized with what response-to-wish level of confidence. In some embodiments, the storytelling engine 112 can be configured to identify the realization story from the availability of branches in the hyperstory and notify the user even if the response-to-wish confidential level is not high enough.

In some embodiments, the storytelling engine 112 can be configured to send information of realization story to the database 116, and the database 116 can be configured to store the information of realization story. As such, other components in the TV 110, such as the video generator 114, or the like, can retrieve the information of realization story from the database 116. The information of the realization story can include a position/index of the wishing point vertex in the hyperstory, a position/index of the realization vertex in the hyperstory, and positions/indexes of other vertices in the realization path.

The video generator 114 can be configured to generate the realization video according to the realization story found by the storytelling engine 112. In some embodiments, the video generator 114 can be configured to receive the information of the realization story from the database 116. The video generator 114 can be further configured to retrieve steps of the realization story in the hyperstory from the database 116 according to the information of the realization story. For example, the steps of the realization story corresponding to the wishing point vertex, the determined realization vertex, and other vertices in the realization path can be retrieved from the scalable hyperstory generator 113.

Since the steps of the realization story are in text format, the video generator 114 can be further configured to generate the realization video from the steps of the realization story in the text format using any suitable auto-cinematography method, for example, an importance-driven approach to cinematic replay that can exploit both narrative and geometric information in games to automatically compute camera paths and edits. The realization video can include a plurality of video clips and each video clip may correspond to one step of the realization story.

In some embodiments, the video generator 114 can be configured to send the plurality of video clips of the realization video to the database 116, and the database 116 can be configured to store the plurality of video clips. As such, other components in the TV 110, such as the output video scheduler 115, or the like, can retrieve the plurality of video clips from the database 116.

The output video scheduler 115 can be configured to dynamically schedule the plurality of video clips of the realization video according to the realization story found by storytelling engine 112, and output the plurality of video clips of the realization video to be displayed on the screen of the TV 110. For example, the output video scheduler 115 can be configured to schedule the plurality of video clips of the realization video according to an order of the steps of the realization story and output the plurality of video clips of the realization video to be displayed on the screen of the TV 110.

The database 116 can include an in-memory database, an on-disk database, or a combination thereof. In some embodiments, the database 116 can be bypassed or omitted. For example, the storytelling engine 112 can be coupled to the scalable hyperstory generator 113 and configured to retrieve the hyperstory directly from the scalable hyperstory generator 113. The video generator 114 can be coupled to the storytelling engine 112 and configured to retrieve the information of the realization story directly from the storytelling engine 112. The output video scheduler 116 can be coupled to the video generator 114 and configured to retrieve the video clips of the realization video directly from the video generator 114.

In some embodiments, the user intent recognizer 111, the storytelling engine 112, the scalable hyperstory generator 113, the video generator 114, the output video scheduler 115, and the database shown in FIG. 2 can be separate, individual components or circuits coupled together. In some embodiments, the TV 110 can include an integrated circuit (IC) chip with different portions of the IC chip being configured to function as the various components shown in FIG. 2.

Consistent with the disclosure, the TV 110 can allow the user to make wish at any time using various interaction mechanisms, and the TV 110 can respond to his/her wish right away and notify how soon the user's wish will be realized and in what response-to-wish confidence level. It can be appreciated that the user's wish may change an original story to a completely different story, and the user may repeat watching the story with different wishes at various time, thus an original TV watching experience implicitly becomes an exploration experience with user's spontaneous engagement.

Figure 7:
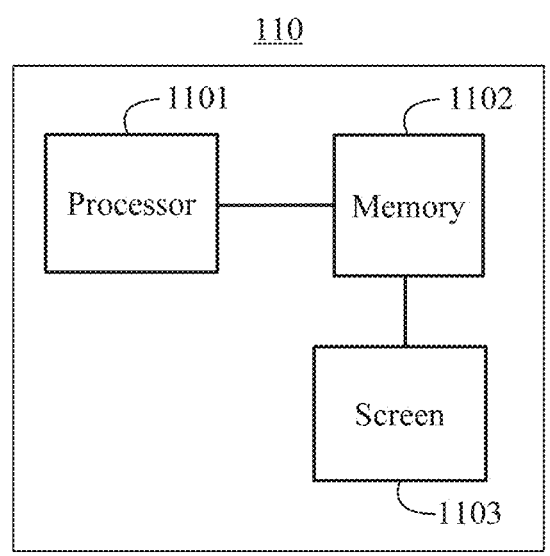
FIG. 7 is a schematic diagram of another exemplary TV consistent with embodiments of the disclosure.

FIG. 7 is a schematic diagram of another example TV 110 consistent with the disclosure. As shown in FIG. 7, the TV 110 includes a processor 1101, a memory 1102 coupled to the processor 1101, and a screen 1103 coupled to the memory 1102.

The processor 1101 can include any suitable hardware processor, such as a microprocessor, a micro-controller, a central processing unit (CPU), a network processor (NP), a digital signal processor (DSP), an application specific integrated circuit (ASIC), a field-programmable gate array (FPGA), and/or another programmable logic device, discrete gate or transistor logic device, discrete hardware component. The memory 1102 can include a non-transitory computer-readable storage medium, such as a random-access memory (RAM), a read only memory, a flash memory, a volatile memory, a hard disk storage, or an optical medium.

The memory 1102 can store computer program codes that, when executed by the processor 1101, cause the processor 1101 to perform the interaction method consistent with the disclosure, such as, one of the examples interaction methods described below, to realize the functions of the various components shown in FIG. 2. In some embodiments, the memory 1102 can be further configured to store the hyperstory, the information of the realization story, the video clips of the realization video, and/or the like.

In some embodiments, the processor 1101 and the memory 1102 can be arranged in a physical TV box of the TV 110. In some other embodiments, the processor 1101 and the memory 1102 can be arranged outside the physical TV box of the TV 110 and served as a cloud services that the TV 100 can access and use.

The screen 1103 can be configured to display the realization video and/or the feedback message (e.g., the realization latency, the response-to-wish confidence level, and/or the like) to the user. In some embodiments, the screen 1103 can include a touch panel for receiving the interaction from the user. The user can input the interaction by touching the screen 1103 with an external object, such as a finger of the user or a stylus. For example, the user can express his/her wish by inputting the text command, for example, "I hope Sam will win," via touching the screen 1103 with his/her finger. In some embodiments, the user can adjust TV parameters, such as brightness, contrast, saturation, and/or the like, by touching the screen 1103 with his/her finger.

Consistent with the disclosure, the TV 110 can combine the relaxing nature of TV experience and the human being's nature of curiosity and tendency of involvement. As such, the TV 110 can transform the original TV watching experience into the exploration experience with user's spontaneous engagement.

Interaction methods consistent with the disclosure will be described in more detail below. An interaction method consistent with the disclosure can be implemented in the TV consistent with the disclosure, such as the TV 110 of the video entertainment system 100 described above.

Figure 8:
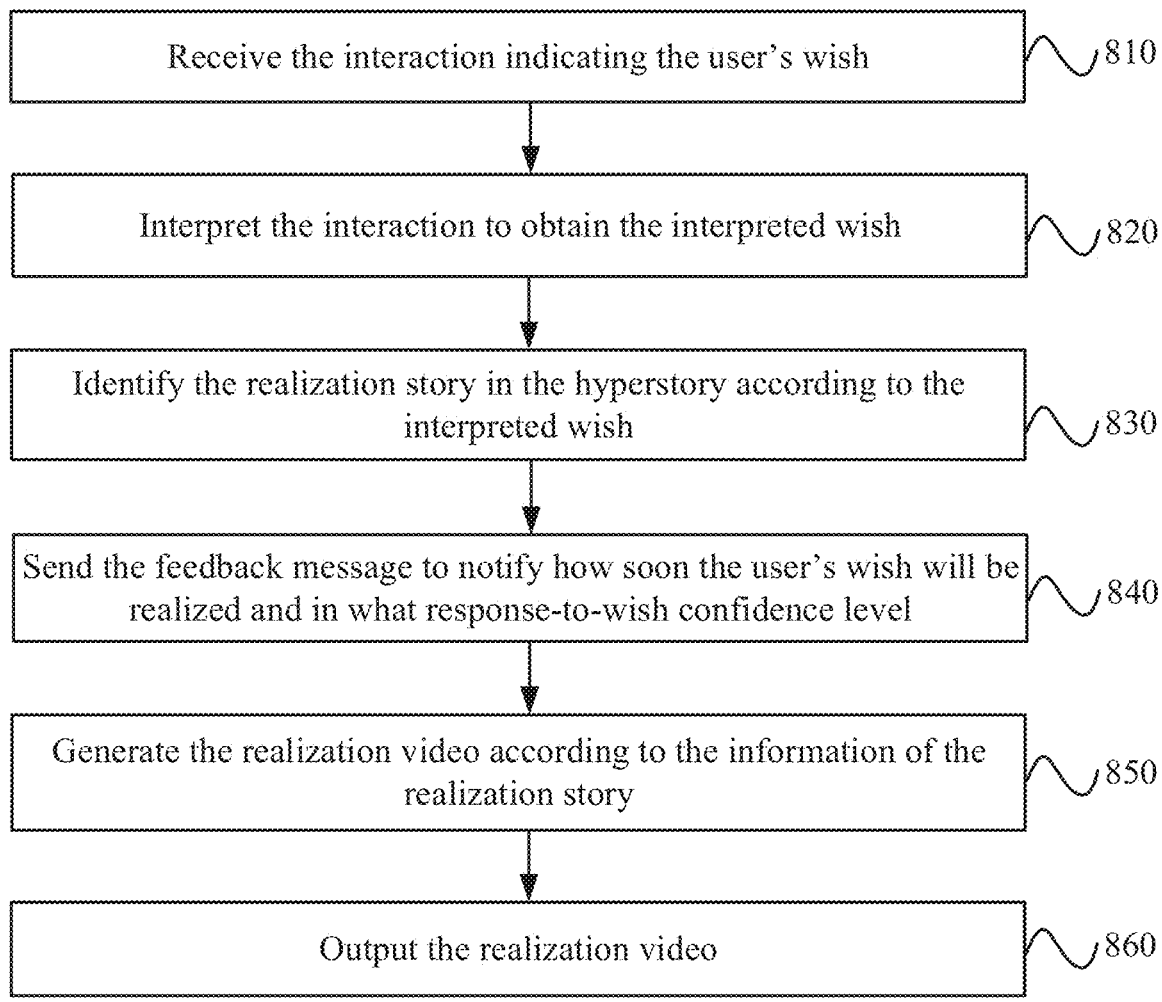
FIG. 8 is a schematic flow chart of an interaction method consistent with embodiments of the disclosure.

FIG. 8 is a flow chart of an interaction method 800 consistent with the disclosure. As shown in FIG. 8, at 810, the interaction indicating the user's wish is received. The interaction can indicate the user's wish, for example, to change a character's arc, make a choice for the character, add a new event, or the like. The interaction can be inputted by the user at any time. The interaction can include, for example, the voice command, the text command, the hand gesture, the head movement, the eye movement, or the like. The process at 810 can be implemented by, for example, the user intent recognizer 111 or the processor 1101 of the TV 110 described above.

At 820, the interaction is interpreted to obtain the interpreted wish. In some embodiments, the interpreted wish can include the template of wish command, for example, "who+what+when+where", and/or the like. The interaction can be interpreted based on its format to derive the wish information, for example, who, when, what (character status), where, or the like, and converted the wish information to the template of wish command. For example, if the interaction includes the voice command, the NLP can be performed to derive the wish information, for example, who, when, what (character status), or the like, from the voice command and convert the wish information to the template of wish command. As another example, if the interaction includes the text command, the text command can be directly converted to the template of wish command. If the interaction includes the hand gesture, the hand gesture can be recognized by performing any suitable hand gesture recognition algorithm, and if the interaction includes the head movement or the eye movement, the head movement or eye movement can be tracked by performing any suitable motion tracking algorithm. The process at 820 can be implemented by, for example, the user intent recognizer 111 or the processor 1101 of the TV 110 described above.

At 830, the realization story is found in the hyperstory according to the interpreted wish. In some embodiments, the realization story can be found from the existing availability of the story branches in the hyperstory according to the interpreted wish. The hyperstory refers to the network of stories or the story graph including various branches.

In some embodiments, the interaction method 800 can further include generating the hyperstory. For example, the hyperstory can be represented using the DAG structure. Each vertex in the DAG represents a status of one of main characters, and the directed edge from one vertex to another refers to an event that causes status changes of the corresponding character. The edges from one vertex to multiple vertices can be considered as the multiple branches of the story graph. The hyperstory can be generated by, for example, the scalable hyperstory generator 113 or the processor 1101 of the TV 110 described above.

In some embodiments, the wishing point vertex can be determined as the vertex close to the point when the interaction of the user is received. The possible realization vertices and the possible realization paths from the wishing point vertex to the possible realization vertices can be determined according to the interpreted wish. In some embodiments, the realization vertex and the realization path can be determined from all possible realization vertices and all possible realization paths using the WRD method consistent with the disclosure.

Figure 9:
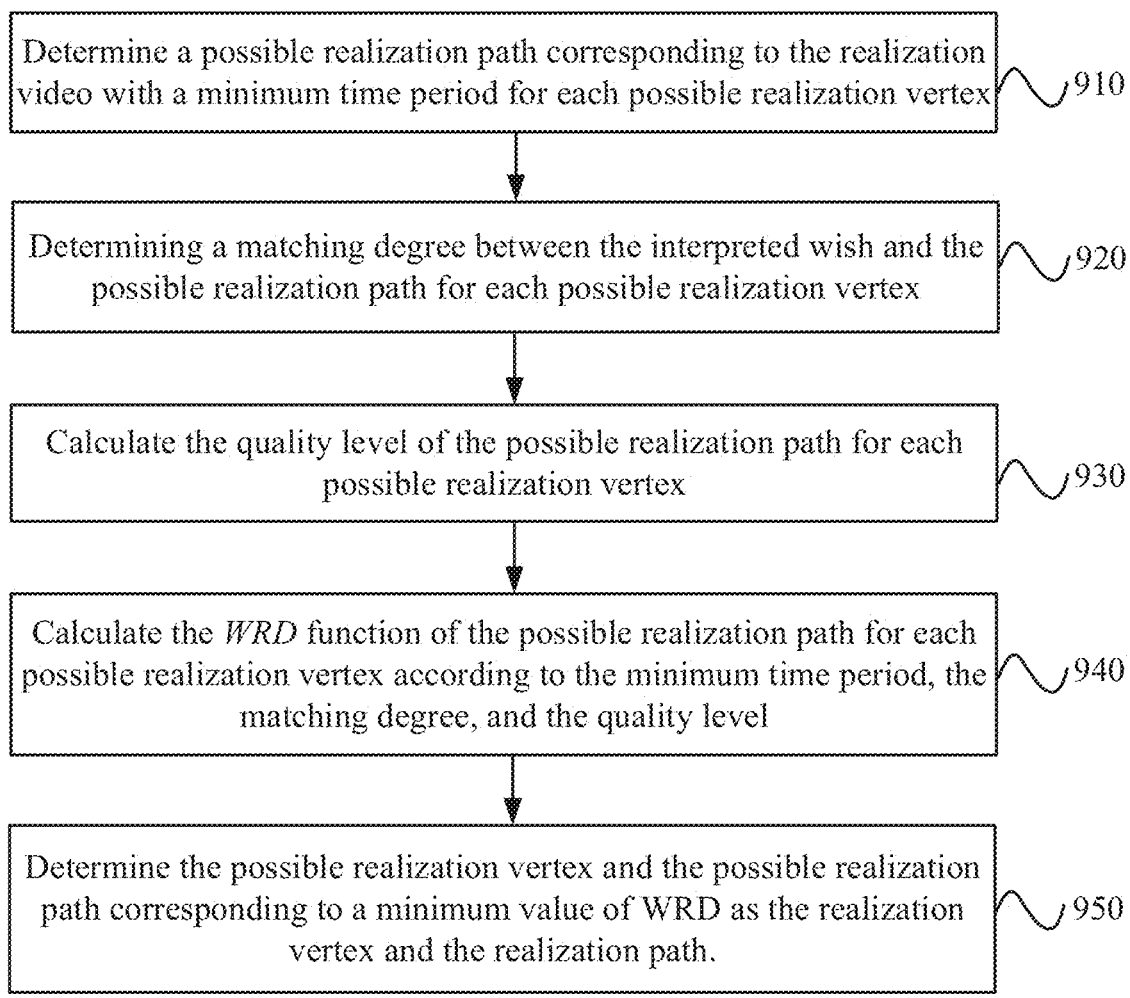
FIG. 9 is a schematic flow chart of a wish-realization distance (WRD) method consistent with embodiments of the disclosure.

FIG. 9 is a flow chart of a WRD method consistent with the disclosure. Referring back to Table 1 and FIGS. 5 and 6, assume that N denotes the number of steps in the hyperstory shown in Table 1 and FIG. 5. The N may be a small number if only key developments of the character statuses are considered, but N may also be a large number when the actions of characters and emotional changes are zoomed-in and more factors are considered in the character statuses. When the N is sufficiently large, for example, the movies can be divided into N steps and in average each step occupies at most one minute (or even less), then a continuous dimension of time can be converted into a discrete number of steps. On the other hand, it is reasonable to claim the number of all possible character statuses is limited. Assume that M denotes the number of all combination of character statuses, thus the DAG space demonstrated in Table 1 and FIG. 5 can be represented by a vertex matrix of size M*N as illustrated in FIG. 6. Assume that $V_{i,j}$ (i<N, j<M) denotes the ith column and jth row vertex in the vertex matrix of the FIG. 6, then the problem of identifying the realization story can be represented by: given the user's wish made at time near step x and an associate vertex $V_{x,y}$ (i.e., the wishing point vertex), a realization vertex of $V_{rx,ry}$ and a realization path that bridge $V_{x,y}$ and $V_{rx,ry}$ are required to be determined from all the possibilities to realize the user's wish.

As shown in FIG. 9, at 910, a possible realization path corresponding to the realization video with a minimum time period is determined for each possible realization vertex.

Considering any connected vertex pair in the DAG, $V_{x,y}$ and $V_{x+1, yy}$, assume that $T(V_{x,y}, V_{x+1, yy})$ denotes a time period of video clip for the step between $V_{x,y}$ and $V_{x+1, yy}$ (i.e., a show performance time), then for any connected (with the possible realization path) but not directed connected vertex pair $V_{x,y}$ and $V_{rx,ry}$ (rx>x+1), $T(V_{x,y}, V_{rx,ry})$ can be calculated recursively as:

$$T(V_{x,y}, V_{rx,ry}) = \text{Minimum}[T(V_{x,y}, V_{x+1,yy}) + T(V_{x+1,yy}, V_{rx,ry})] \text{ for all vertices } V_{x+1,yy} \text{ connected directly to } V_{x,y} \quad (1)$$

The $T(V_{x,y}, V_{rx,ry})$ represents a choice of the realization video with the minimum time period. As such, edges bridging the wishing point vertex $V_{x,y}$ and the possible realization vertex $V_{rx,ry}$ corresponding to the realization video with the minimum time period $T(V_{x,y}, V_{rx,ry})$ can be obtained. The possible realization path (from the wishing point vertex $V_{x,y}$ to the realization vertex $V_{rx,ry}$) corresponding to the realization video with the minimum time period $T(V_{x,y}, V_{rx,ry})$ can be determined as the path of selected edges for $T(V_{x,y}, V_{rx,ry})$ and denoted as $P(V_{x,y}, V_{rx,ry})$.

At 920, a matching degree between the interpreted wish and the possible realization path is analyzed for each possible realization vertex.

Assume that w denotes the interpreted wish derived from the interaction the user currently made, $S(w, V_{x,y}, V_{rx,ry})$ denotes the matching degree between the interpreted wish and the possible realization path, and a value of S function can be in a range of [0.0, 1.0] and the larger value the better match. Generally the user's wish can include changing the status of a character or preventing a change, which is something related to actions of punish, save, forgive, win, escape, seek, or the like, and thus a trajectory of the character's status change in the possible realization path of $P(V_{x,y}, V_{rx,ry})$ (as an example shown in FIG. 5) can be analyzed to determine the matching degree between the possible realization path $P(V_{x,y}, V_{rx,ry})$ and the interpreted wish. It can be appreciated that the matching degree may be considered as a very critical factor in determining the realization path among all possible realization paths.

At 930, the quality level of the possible realization path is calculated for each possible realization vertex.

Assume that $Q(V_{x,y}, V_{x+1, yy})$ denotes the quality level of this step, then for any connected (with the possible realization path) but not directed connected vertex pair $V_{x,y}$ and $V_{rx,ry}$ (rx>x+1), $Q(V_{x,y}, V_{rx,ry})$ can be calculated as:

$$Q(V_{x,y}, V_{rx,ry}) = \text{Minimum}[Q(V_1, V_2), \text{ for any edge } (V_1, V_2) \text{ in } P(V_{x,y}, V_{rx,ry})] \quad (2)$$

$Q(V_{x,y}, V_{x+1, yy})$ reflects that any step of low quality will bring down the evaluation of all the video clips containing this step, thus during a selection process, the low-quality edge may be not chosen in order to achieve a good quality score unless no other choice can be selected.

At 940, the WRD function of the possible realization path is calculated for each possible realization vertex according to the minimum time period, the matching degree, and the quality level. The WRD refers to a combination of the functions of T, Q, and S with the following calculation process:

$$WRD(w, V_{x,y}, V_{rx,ry}) = a*[1.0 - S(w, V_{x,y}, V_{rx,ry})] + b*T(V_{x,y}, V_{rx,ry}) + (1-a-b)*[Q_{Max} - Q(V_{x,y}, V_{rx,ry})] \quad (3)$$

where $Q_{Max}$ is an upper-bound threshold for the quality level, a and b in the range of [0.0, 1.0] are parameters for system to adjust weights of components S, T and Q, and thus in order to minimize WRD, the matching degree S and quality level Q can be maximized, and the latency T can be minimized. The a and b can be also referred to as a matching degree weight and a latency weight, and a quality level weight equals to 1−a−b.

At 950, the possible realization vertex and the possible realization path corresponding to a minimum value of WRD are determined as the realization vertex and the realization path. A possible realization vertex and its possible realization path with the minimum time period corresponding to the minimum value of WRD among all possible realization vertices and corresponding possible realization paths can be determined as the realization vertex and the realization path. As such, the determined realization path can have a best matching degree of wish and realization, the best story and video quality of the realization process, the shortest latency between wish making and realization.

Consistent with the disclosure, WRD can consider the matching degree of wish and realization, the story and video quality of the realization process, the latency between wish making and realization, and the like. With the WRD function, the problem of identifying the realization story can be converted to an easier problem of identifying the minimum value for a list of distances.

Figure 10:
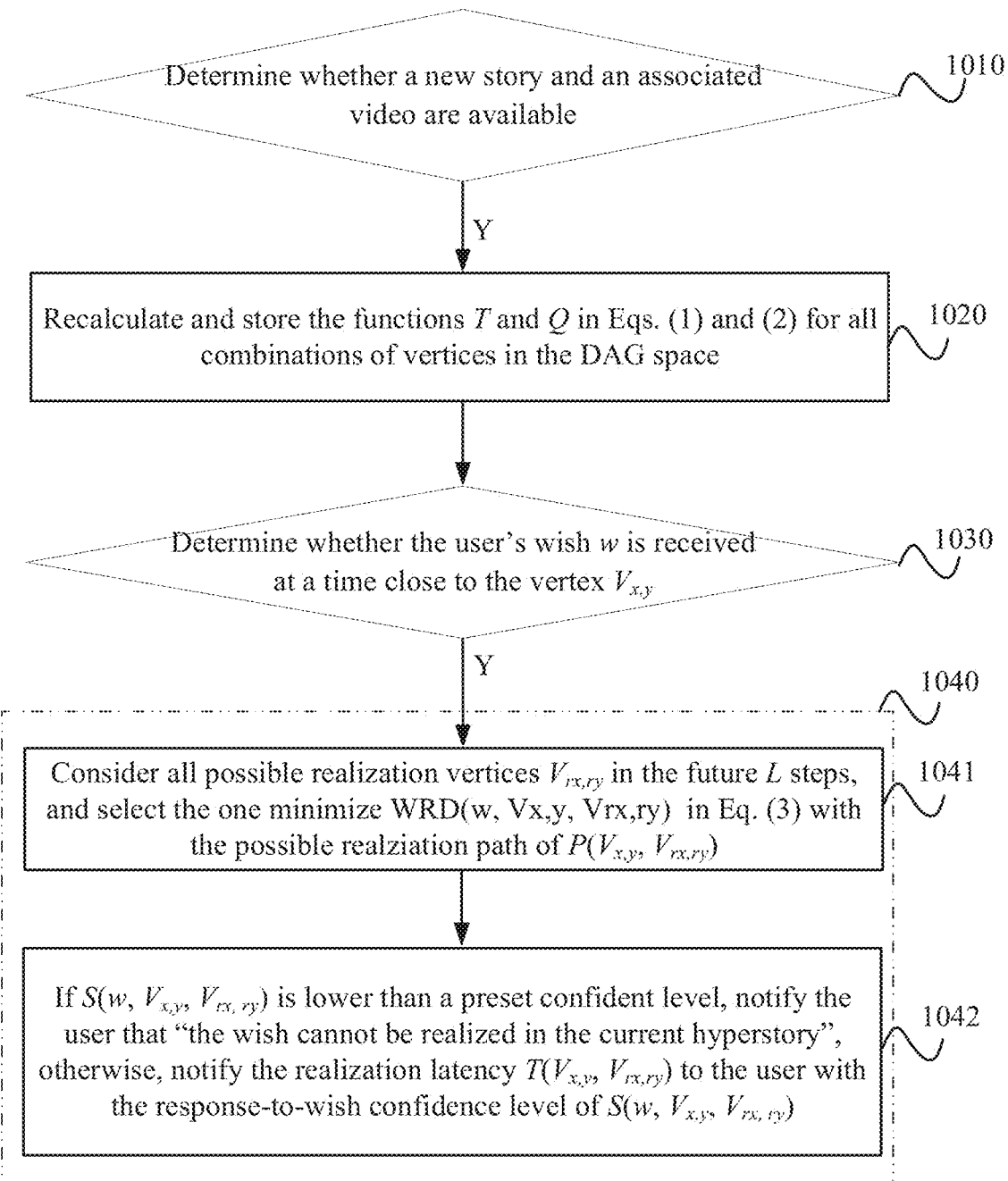
FIG. 10 is a schematic flow chart of an implementation process of a WRD method consistent with the disclosure.

The processes in FIG. 9 can be implemented by the storytelling engine 112 or the processor 1101 of the TV 110 described above. FIG. 10 is a schematic flow chart of an example implementation process of the WRD method 1000 consistent with the disclosure. As shown in FIG. 10, at 1010, whether a new story and an associated video are available is determined.

At 1020, once there is the new story and the associated video are available, the functions T and Q in Eqs. (1) and (2) are recalculated and stored for all combinations of vertices in the DAG space. The new story can be added to, for example, the scalable hyperstory generator 113 or the processor 1101, and the associated video can be generated by, for example the video generator 114 or the processor 1101.

At 1030, whether the user's wish w is received at a time close to the vertex $V_{x,y}$ is determined.

At 1040, once the user's wish w is received at a time close to the vertex $V_{x,y}$, the following processes is performed.

At 1041, all possible realization vertices $V_{rx,ry}$ in the future L steps are considered, and the one minimize WRD(w, $V_{x,y}$, $V_{rx,ry}$) in Eq. (3) is selected with the possible realization path of $P(V_{x,y}, V_{rx,ry})$. L refers to a parameter configurable by, for example, the TV 110 or the user.

At 1042, if $S(w, V_{x,y}, V_{rx, ry})$ is lower than a preset confident level, then the user will be notified that "the wish cannot be realized in the current hyperstory", otherwise, the realization latency $T(V_{x,y}, V_{rx,ry})$ is notified to the user with the response-to-wish confidence level of $S(w, V_{x,y}, V_{rx, ry})$. The preset confident level can include a default value preset by the TV 110 or can be preset by the user.

Referring back to FIG. 8, at 840, the feedback message is sent to notify how soon the user's wish will be realized and in what response-to-wish confidence level. The feedback message can include the realization latency, the response-to-wish confidence level, the quality level, and/or the like. In some embodiments, the feedback message can be sent right after the realization story being found. In some embodiments, the feedback message can be sent to the user, even if the response-to-wish confidential level is not high enough. The process at 840 can be implemented by the storytelling engine 112 or the processor 1101 of the TV 110 described above.

At 850, the realization video is generated according to the information of the realization story. The information of the realization story includes the position/index of the wishing point vertex in the hyperstory, the position/index of the realization vertex in the hyperstory, and the positions/indexes of other vertices in the realization path. Steps of the realization story in the hyperstory can be retrieved according to the information of the realization story. For example, the steps of the realization story correspond to the wishing point vertex, the determined realization vertex, and other vertices in the determined path can be retrieved. The realization video can be generated from the steps of the realization story in the text format using any suitable auto-cinematography method. The process at 850 can be implemented by the output video generator 114 or the processor 1101 of the TV 110 described above.

At 860, the realization video is outputted. The plurality of video clips of the realization video can be dynamically scheduled according to the realization story, and outputted to be displayed on the screen of the TV. For example, the plurality of video clips of the realization video can be scheduled according to the order of the steps of the realization story and outputted to be displayed on the screen of the TV. The process at 860 can be implemented by the output video scheduler 115 or the processor 1101 of the TV 110 described above.

Consistent with the disclosure, the interaction method can allow the user to make wish at any time using various interaction mechanisms, and the TV can respond to his/her wish right away and notify how soon the user's wish will be realized in the storytelling and in what response-to-wish confidence level. It can be appreciated that the user's wish may change the original story to a completely different story, and the user may repeat watching the story with different wishes at various time, thus the original TV watching experience implicitly becomes the exploration experience with user's spontaneous engagement.

The present disclosure also provides a computer readable medium. The computer readable medium can store instructions that, when executed by a computer, cause the computer to perform an interaction method consistent with the disclosure, such as, one of the examples interaction methods described above. The computer readable medium can include a non-transitory computer-readable storage medium, such as a random-access memory (RAM), a read only memory, a flash memory, a volatile memory, a hard disk storage, or an optical medium.

Other embodiments of the disclosure will be apparent to those skilled in the art from consideration of the specification and practice of the embodiments disclosed herein. It is intended that the specification and examples be considered as exemplary only and not to limit the scope of the disclosure, with a true scope and spirit of the invention being indicated by the following claims.

What is claimed is:

1. An interaction method, comprising:
   receiving an interaction indicating a user's wish;
   interpreting the interaction to obtain an interpreted wish;
   identifying a realization story in a hyperstory according to the interpreted wish;
   sending a feedback message indicating a time the user's wish will be realized and a response-to-wish confidence level, wherein the feedback message includes a realization latency, the response-to-wish confidence level, and a quality level;
   generating a realization video according to the realization story; and
   outputting the realization video.

2. The method of claim 1, wherein interpreting the interaction to obtain the interpreted wish includes:
   interpreting the interaction to derive wish information about who, what, when, and where; and
   converting the wish information to the interpreted wish, the interpret wish including a template of wish command consistent with the derived information of who, what, when, and where.

3. The method of claim 1, further comprising:
   obtaining the hyperstory representing status of one or more characters and events causing status changes of the one or more characters.

4. The method of claim 3, wherein obtaining the hyperstory includes:

representing the hyperstory using a directed acyclic graph (DAG), each vertex in the DAG representing a status of a character and an edge of any connected vertex pair representing an event causing status changes of the character.

5. The method of claim 4, wherein identifying the realization story in the hyperstory according to the interpreted wish includes:

determining a realization vertex satisfying the interpreted wish and a realization path from a wishing point vertex to the realization vertex from existing story branches in the hyperstory based on a realization latency, a quality level, and the response-to-wish confidence level, the wishing point vertex being a vertex close to a point when the interaction is received.

6. The method of claim 5, wherein determining the realization vertex and the realization path includes:

determining the realization vertex and the realization path from the existing story branches in the hyperstory according to a wish-realization-distance (WRD).

7. The method of claim 6, wherein determining the realization vertex and the realization path according to the WRD includes:

for each possible realization vertex in the hyperstory:
determining a possible realization path corresponding to the realization video with a minimum time period;
determining a matching degree between the interpreted wish and the possible realization path;
calculating the quality level of the possible realization path; and
calculating a WRD function of the possible realization path according to the obtained minimum time period, the matching degree of the possible realization path, and the quality level of the possible realization path; and determining the realization vertex and the realization path corresponding to a minimum value of WRD as the realization vertex and the realization path.

8. The method of claim 7, wherein determining the possible realization path corresponding to the realization video with the minimum time period includes:

obtaining the edges bridging the wishing point vertex to the realization vertex by calculating the minimum time period; and
determining the possible realization path as a path of obtained edges.

9. The method of claim 7, wherein calculating the minimum time period includes:

calculating the minimum time period $T(V_{x,y}, V_{rx,ry})$ by recursively calculating Minimum $[T(V_{x,y}, V_{x+1,yy})+T(V_{x+1,yy}, V_{rx,ry})]$ for all vertices $V_{x+1,yy}$ connected directly to $V_{x,y}$, $V_{x,y}$ being the wishing point vertex, the $V_{rx,ry}$ being the possible realization vertex, $V_{x+1,yy}$ being a vertex directly connected to the $V_{x,y}$.

10. The method of claim 7, wherein determining the matching degree between the interpreted wish and the possible realization path includes:

calculating a trajectory of the character's status change in the realization path to determine the matching degree between the interpreted wish and the possible realization path.

11. The method of claim 7, wherein calculating the quality level of the possible realization path includes:

calculating the quality level of the possible realization path as a minimum value of the quality levels of steps within the possible realization path.

12. The method of claim 7, wherein calculating the WRD function of the possible realization path includes:

calculating the WRD function as a sum of a matching degree weight times a difference between one and the matching degree of the possible realization path, a latency weight times a time period of video corresponding to the possible realization path, and a quality level weight times a difference between an upper-bound threshold for the quality level and the quality level of the possible realization path, the quality level weight being one minus the matching degree weight and the latency weight, and the matching degree weight, the latency weigh, and the quality level weight being in a range of 0 to 1.

13. The method of claim 1, wherein generating the realization video according to the realization story includes:

retrieving steps of the realization story in the hyperstory, according to the realization story, including an index of the wishing point vertex, an index of the determined realization vertex, and indexes of other vertices in the determined path; and
generating the realization video from the steps of the realization story using an auto-cinematography method.

14. A television (TV) comprising:

a processor;
a memory coupled to the processor and storing instructions that, when executed by the processor, cause the processor to:
receive an interaction indicating a user's wish;
interpret the interaction to obtain an interpreted wish;
identify a realization story in a hyperstory according to the interpreted wish;
send a feedback message indicating a time the user's wish will be realized and a response-to-wish confidence level, wherein the feedback message includes a realization latency, the response-to-wish confidence level, and a quality level;
generate a realization video according to the realization story; and
output the realization video; and
a screen coupled to the memory and configured to display the realization video.

15. The TV of claim 14, wherein the instructions further cause the processor to:

interpret the interaction to derive wish information about who, what, when, and where; and
convert the wish information to the interpreted wish, the interpret wish including a template of wish command consistent with the derived wish information of who, what, when, and where.

16. The TV of claim 14, wherein the instructions further cause the processor to:

obtain the hyperstory representing status of one or more characters and events causing status changes of the one or more characters.

17. The TV of claim 16, wherein the instructions further cause the processor to:

represent the hyperstory using a directed acyclic graph (DAG), each vertex in the DAG representing a status of a character and an edge of any connected vertex pair representing an event causing status changes of the character.

18. The TV of claim 17, wherein the instructions further cause the processor to:
  determine a realization vertex satisfying the interpreted wish and a realization path from a wishing point vertex to the realization vertex from an existing availability of story branches in the hyperstory based on a realization latency, a quality level, and the response-to-wish confidence level, the wishing point vertex being a vertex close to a point when the interaction is received.

19. The TV of claim 18, wherein the instructions further cause the processor to:
  determine the realization vertex and the realization path from the story branches in the hyperstory according to a wish-realization-distance (WRD).

20. The TV of claim 19, wherein the instructions further cause the processor to:
  for each possible realization vertex in the hyperstory:
    determine a possible realization path corresponding to the realization video with a minimum time period;
    analyze a matching degree between the interpreted wish and the possible realization path;
    calculate the quality level of the possible realization path; and
    calculate a WRD function of the possible realization path according to the obtained minimum time period, the matching degree of the possible realization path, and the quality level of the possible realization path; and
  determine the realization vertex and the realization path corresponding to a minimum value of WRD as the realization vertex and the realization path.

21. The TV of claim 20, wherein the instructions further cause the processor to:
  obtain the edges bridging the wishing point vertex to the possible realization vertex by calculating the minimum time period; and
  determine the possible realization path as a path of obtained edges.

22. A non-transitory computer readable medium storing instructions that, when executed by a computer, cause the computer to:
  receive an interaction indicating a user's wish;
  interpret the interaction to obtain an interpreted wish;
  identify a realization story in a hyperstory according to the interpreted wish;
  send a feedback message indicating a time the user's wish will be realized and a response-to-wish confidence level, wherein the feedback message includes a realization latency, the response-to-wish confidence level, and a quality level;
  generate a realization video according to the realization story; and
  output the realization video.

23. The computer readable medium of claim 22, wherein the instructions further cause the computer to:
  interpret the interaction to derive wish information about who, what, when, and where; and
  convert the wish information to the interpreted wish, the interpret wish including a template of wish command consistent with the derived wish information of who, what, when, and where.

24. The computer readable medium of claim 22, wherein the instructions further cause the computer to:
  obtain the hyperstory representing status of one or more characters and events causing status changes of the one or more characters.

25. The computer readable medium of claim 24, wherein the instructions further cause the computer to:
  represent the hyperstory using a directed acyclic graph (DAG), each vertex in the DAG representing a status of a character and an edge of any connected vertex pair representing an event causing status changes of the character.

26. The computer readable medium of claim 25, wherein the instructions further cause the computer to:
  determine a realization vertex satisfying the interpreted wish and a realization path from a wishing point vertex to the realization vertex from an existing availability of story branches in the hyperstory based on a realization latency, a quality level, and the response-to-wish confidence level, the wishing point vertex being a vertex close to a point when the interaction is received.

27. The computer readable medium of claim 26, wherein the instructions further cause the computer to:
  determine the realization vertex and the realization path from the story branches in the hyperstory according to a wish-realization-distance (WRD).

28. The computer readable medium of claim 27, wherein the instructions further cause the computer to:
  for each possible realization vertex in the hyperstory:
    determine a possible realization path corresponding to the realization video with a minimum time period;
    analyze a matching degree between the interpreted wish and the possible realization path;
    calculate the quality level of the possible realization path; and
    calculate a WRD function of the possible realization path according to the obtained minimum time period, the matching degree of the possible realization path, and the quality level of the possible realization path; and
  determine the realization vertex and the realization path corresponding to a minimum value of WRD as the realization vertex and the realization path.

29. The computer readable medium of claim 28, wherein the instructions further cause the computer to:
  obtain the edges bridging the wishing point vertex to the possible realization vertex by calculating the minimum time period; and
  determine the possible realization path as a path of obtained edges.

* * * * *